Nov. 18, 1947.  R. K. PEPPER  2,431,076
HYDRAULIC APPARATUS FOR TRANSMITTING POWER FROM ONE MEMBER TO ANOTHER
Filed Nov. 29, 1945  3 Sheets-Sheet 1
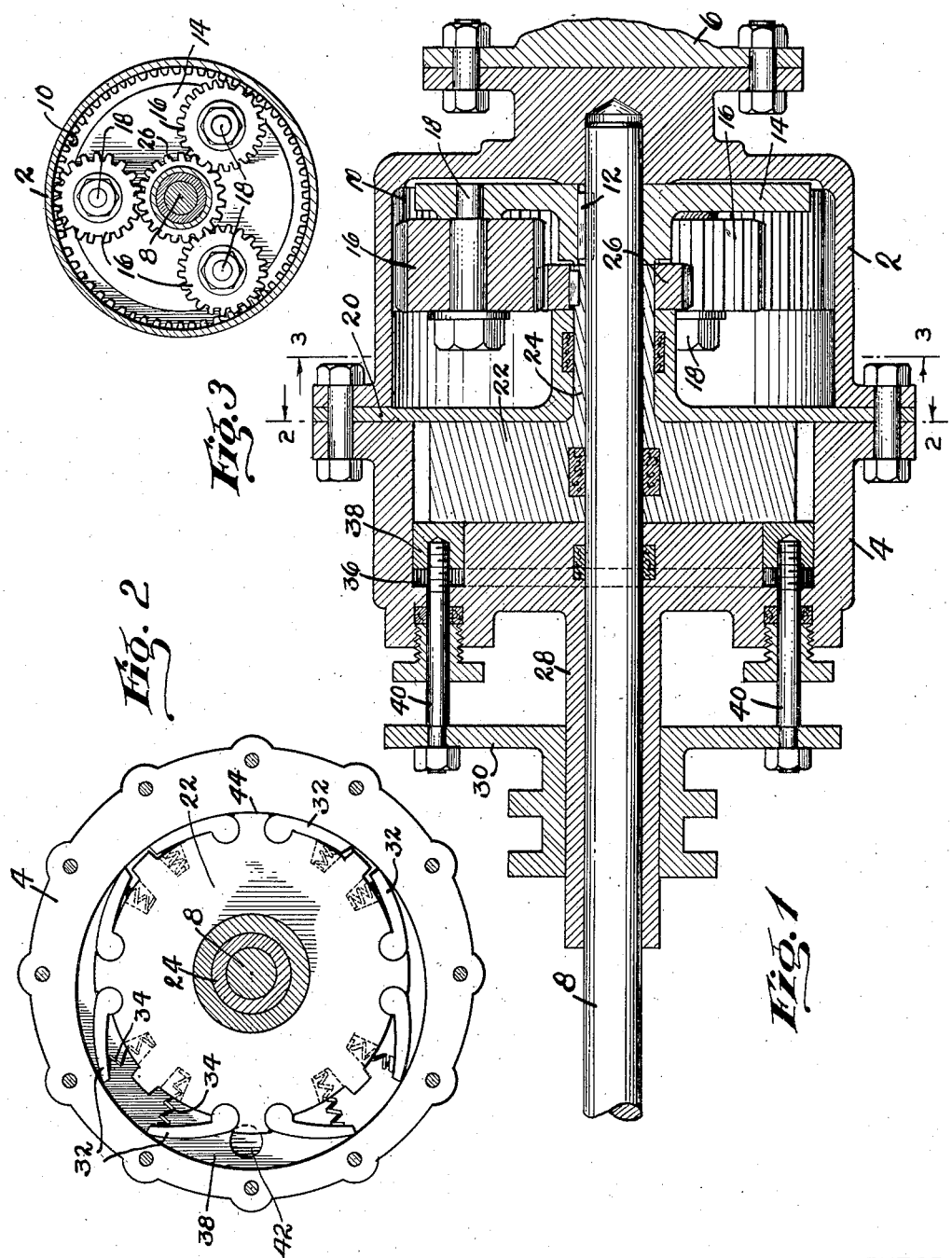
INVENTOR
ROBERT K. PEPPER
BY James G. Beihell.
ATTORNEY

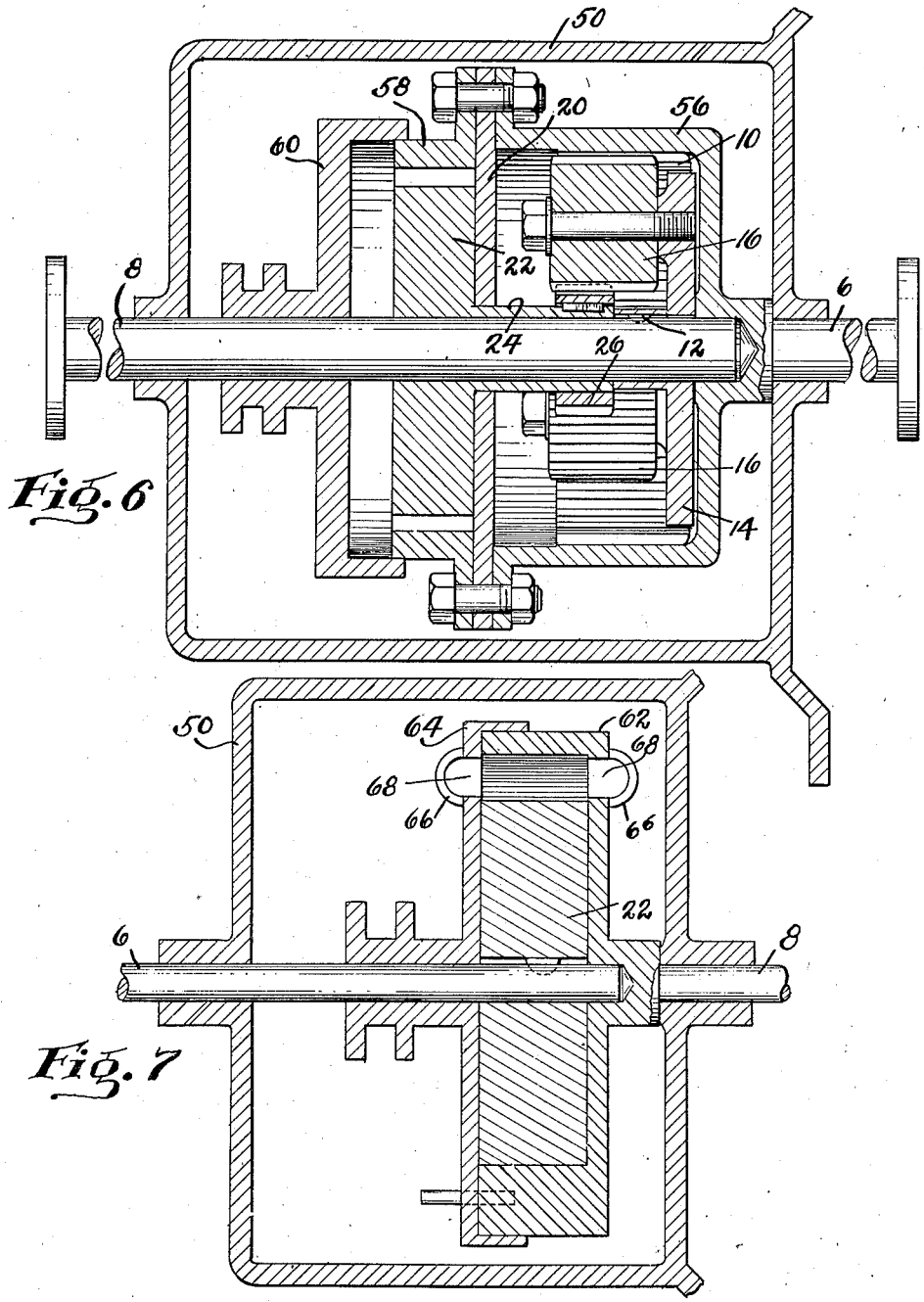

Patented Nov. 18, 1947

2,431,076

UNITED STATES PATENT OFFICE 2,431,076

HYDRAULIC APPARATUS FOR TRANSMITTING POWER FROM ONE MEMBER TO ANOTHER

Robert K. Pepper, Syracuse, N. Y.

Application November 29, 1945, Serial No. 631,676

9 Claims. (Cl. 192—58)

My invention relates to an improvement in hydraulic transmission mechanism, that is to mechanism for transmitting power from a driving member, a drive shaft for example, to a driven member such as a driven shaft.

One of the objects of my invention is to provide mechanism for transmitting power hydraulically wherein an infinite number of speed ratios may be obtained between a driving member and a driven member, from one-to-one where the two members are driven as a unit at the same speed down to where the driven member is stationary.

A further object of my invention is to provide mechanism or apparatus of this type wherein the construction is very much simplified as compared with existing equipment, does not require the services of a skilled operator, and is of very rugged construction so as to adapt the same for use in heavy equipment such as road machinery, caterpillars, tanks, etc., etc.

A still further object of my invention is to provide a mechanism for transmitting power from a driving member to a driven member in which I employ a rotor mounted in a confined space filled with oil, means being provided whereby this space may be varied in area as desired thereby to vary the operation of the apparatus so as to transmit power from the driving member to the driven member in an infinite number of steps.

A still further object of my invention is to provide a rotor of novel construction which functions in a novel way to seal the oil or other liquid employed, this sealing being progressive, in that the sealing action is increased from minimum to maximum as the rotor is rotated through one revolution.

A still further object of my invention is to provide a throttle or control for my apparatus which I believe to be novel in construction.

Another object of my invention is to provide apparatus of the type described in which means have been provided whereby I am assured of an adequate supply of oil or other liquid employed to the rotor.

Other and further advantages of my apparatus will be apparent from the following description and a study of the drawings.

In the accompanying drawings,

Fig. 1 is a sectional side elevational view of one embodiment of my invention, particularly adaptable for heavy duty;

Fig. 2 is a section on the line 2—2 of Fig. 1;

Fig. 3 is a section on the line 3—3 of Fig. 1;

Fig. 6 is a sectional side elevational view of another embodiment of my invention; and Fig. 7 is a similar view of still another embodiment of the invention.

Figure 4:
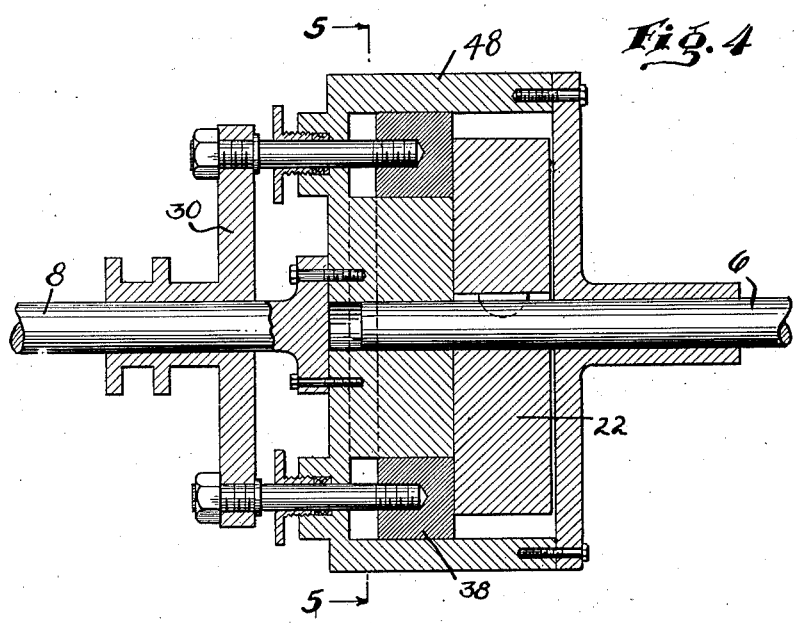
Fig. 4 is a sectional side elevational view of another embodiment of the invention, more particularly adapted for light duty.

Referring to the drawings in detail, and first of all to Figs. 1, 2 and 3;

2 and 4 designate the two sections of the rotatable cylindrical housing of my improved hydraulic clutch and brake device. The part designated 6 at the right hand end of the housing may be a motor or other driving element.

8 is a shaft to be driven from 6, this shaft extending longitudinally of the housing sections as appears from Fig. 1.

The housing section 2 is provided internally with gear teeth 10. Within the housing section 2, keyed to the driven shaft 8 as shown at 12 is a planetary gear plate 14, carrying planetary gears 16, rotatably secured to the face of the plate by bolts or studs 18.

Extending across the housing and bolted between the two housing sections is a plate 20, and freely mounted upon the driven shaft 8 at the side of plate 20 opposite the planetary gears referred to is a rotor 22, this rotor being provided with a hub 24 which extends into housing section 2 and upon which is splined the central or master gear 26 which is in constant mesh with the planet gears 16 already referred to.

The housing section 4 has a rearward extension 28 which provides a bearing for the shaft 8, the exterior of this extension providing a bearing for spider 30 which is adapted to be moved along the axis of driven shaft 8 as will be brought out hereinafter.

Reverting to the rotor 22 previously referred to, it will be seen from Fig. 2 that the rotor as well as driven shaft 8 which are concentric with each other, are disposed eccentrically of the housing section 4. The rotor 22 is appreciably smaller in diameter than the inside diameter of the housing section 4 and is provided about its periphery with pairs of sealing pawls 32. These pawls are pivotally mounted in the periphery of the rotor and are forced outwardly against the housing wall by springs 34. It is to be noted also that the pawls of each pair extend toward each other, so that one pawl of each pair is operative on one direction of rotation of the rotor while the other pawl of each pair is operative on rotation of the rotor in the opposite direction. This construction it will be appreciated provides a seal between the housing wall and the rotor, and due to the fact that the rotor is eccentric to the housing, the seal progressively increases from minimum at the left side of Fig. 2 to maximum at the opposite side.

To the rear of rotor 22, that is toward the outer end of driven shaft 8, the housing is provided interiorly with an annular space 36 which is eccentric to shaft 8 and into which is fitted an annulus or ring 38, which may be referred to as a valve. The inside diameter of this ring or valve is substantially less than the outside diameter of the rotor 22 as will be seen from Fig. 1, so there is a substantial overlap of these two members. The valve 38 is movable bodily toward and away from rotor 22 by moving the spider 30 already referred to, and to which it is connected by rods 40 extending through suitable stuffing boxes in the rear wall of housing section 4.

The ring or valve 38 is provided with an opening or port 42 which is disposed diametrically opposite the point 44 where the periphery of the rotor 22 contacts the wall of the housing section 2.

The housing is completely filled with oil or other liquid when placed in operation. In Fig. 1 I have shown the valve or ring 38 in its innermost position, namely against the side of the rotor 22. Under these conditions the liquid in the space within housing section 4 between the wall of the housing and the rotor 22 is prevented from circulating by the valve or ring 38. Consequently if power is now applied to driver 6, not only is the housing rotated, but all the mechanism within the housing, so that shaft 8 will be driven at the same speed as driver 6. Now if it is desired to reduce the speed of driven shaft 8 relatively to driver 6, it is merely necessary to move the control ring or valve, 38, rearwardly or outwardly away from the rotor 22, this movement being facilitated by port 42. This in effect enlarges the space within which the rotor 22 is confined so that the fluid in the housing can circulate to provide for slippage or relative movement between driver 6 and driven member 8. The amount of slippage or slow-down of driven member 8 will depend upon the extent of the rearward movement given valve 38. With 38 fully retracted driven shaft 8 will stand still theoretically.

Figure 5:
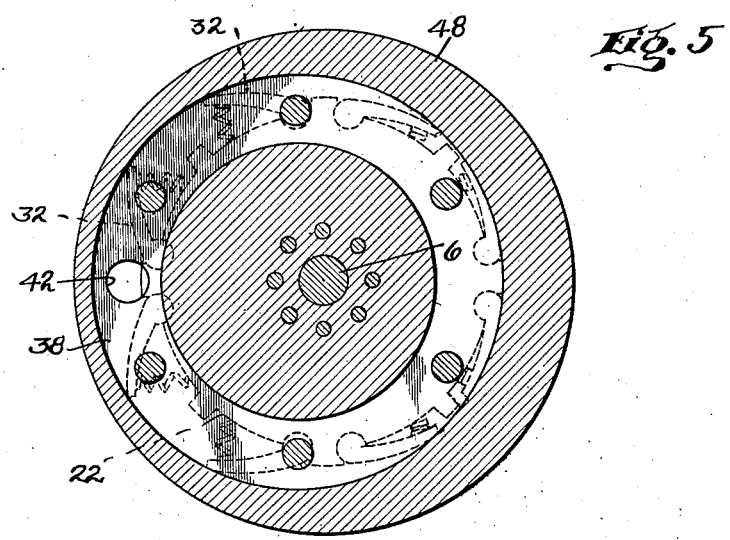
Fig. 5 is a section on the line 5—5 of Fig. 4.

In the embodiment of my invention illustrated in Figs. 4 and 5, 6 designates the driving shaft and 8 the shaft to be driven. In this instance the driven shaft 8 is secured directly to the rear of the rotary housing 48. Within the housing 48, I provide rotor 22 which corresponds to rotor 22 of Fig. 1 and is equipped with pairs of pawls 32. The rotor is keyed to the driving shaft 6. This embodiment of the invention is also provided with ring or valve 38 identical with valve 38 already described. This valve is adapted to be moved bodily in the chamber within the housing 48 behind the rotor 22 by means of spider 30.

The ring or valve 38 is provided with a port 42 corresponding in function and location to the port 42 of the embodiment of my invention already described.

This embodiment of the invention is adapted primarily for light duty as compared with the construction of Fig. 1. It will be appreciated that the housing 48 is filled with oil and with the valve 38 in its innermost position the rotor 22 is locked against rotation relatively to the housing and hence if power is applied to driving shaft 6, the housing 48 and the mechanism within the same as well as shaft 8 will be driven as a unit. By retracting the valve or ring 38 the fluid with which the housing is filled is allowed to circulate to an extent dependent upon the setting of the ring 38 to reduce the speed of the shaft 8 accordingly.

Fig. 6 illustrates another embodiment of my invention which is primarily intended for heavier duty than the embodiment last described.

The apparatus of Fig. 6 embodies a stationary housing 50 which is kept filled with oil, driving shaft 6 extending into one end of this housing and driven shaft 8 extending into the opposite end of the housing. Within the stationary housing 50 is a sectional rotatable housing, the section 56 of this housing being rigid with the driving shaft. This housing section 56 is comparable to housing section 2 of Fig. 1 in that it is internally toothed at 10 and houses planetary gears 16 and master gear 26, the gears 16 being carried on plate 14. The plate 14 is keyed at 12 to the driven shaft 8.

Across the rear end of the housing section 56 is plate or partition 20.

Mounted on the driven shaft 8 at the rear of plate 20 is rotor 22 the construction of which is the same as that of Fig. 1 for example, and the front of this rotor is provided with integral hub 24 keyed to the master gear 26. The rotor 22 is enclosed in a housing made in two sections, section 58 which is a ring rigid with housing section 56, and rear section 60 which telescopes the section 58 and is slidable lengthwise thereof so as to vary the space between the rear end or wall 60 of the housing and the rotor 22.

It is to be understood that the fixed housing 50 and the rotatable housing are kept filled with oil.

With the parts in the position shown in the drawings rotor 22 is free to rotate, the housing section 60 being fully retracted so that the maximum space is provided behind the rotor, permitting free circulation of the oil within the housing. Consequently if power is applied to drive shaft 6, the driven shaft 8 with but a slight load will remain stationary. To pick up the driven shaft 8 it is merely necessary to move the housing section 60 inwardly toward the rotor 22, and with 60 in its maximum inner position, namely against the rotor 22, it will be apparent that there can be no circulation of the fluid within the inner housing, the rotor 22 is locked, and the shaft 8 will be driven at the same speed as the driving shaft 6. This arrangement therefore provides for an infinite number of speed ratios between shaft 6 and driven shaft 8. The embodiment of the invention illustrated in Fig. 7 is for light duty. In this embodiment of my invention I provide a stationary housing 50. Extending into this housing are driving shaft 6 and driven shaft 8.

Within the housing 50 is a rotatable housing, which is composed of two sections, 62 and 64, section 64 telescoping 62. The housing section 62 is integral with or rigid with the driven shaft 8.

The driving shaft 6 extends into the housing provided by the housing sections 64 and 62, and is keyed to the rotor 22 which is provided within the housing and the construction of which is similar to the rotors 22 already referred to.

In operation the housing 50 is kept filled with oil. The housing sections 62 and 64 are provided with scoops or runners 66 and ports 68 leading thereto to provide for maintaining the rotatable housing filled with oil taken from stationary housing 50.

With the two housing sections 62 and 64 completely telescoped the rotor 22 is substantially locked against rotation so that the drive shaft 6 and driven shaft 8 will be rotated at substantially the same speed. By moving the housing section 64 outwardly away from rotor 22 provision is made for circulation of the oil in the rotor housing so that the speed of the driven shaft 8 will be reduced, and with the housing section 64 fully retracted, the shaft 8 will stand still.

From all of the foregoing it will be apparent that I have provided an apparatus of the hydraulic type for transmitting power from a driving member to a driven member, which is of very simple and rugged design.

It will be apparent also that in all embodiments of the invention described I have provided a rotor adapted to be locked hydraulically so that the drive member and the driven member may be driven at the same speed as a unit, means being provided whereby the rotor may be released so as to obtain an infinite number of speed reductions between the driving member and the member to be driven, without necessitating any slowing down of the driving member.

It is to be understood that changes may be made in the details of construction and arrangement of parts hereinabove described without departing from the spirit and scope of my invention.

What I claim is:

1. Hydraulic apparatus for transmitting power from a driving member to a member to be driven, said apparatus comprising in combination a cylindrical housing, a shaft extending thereinto, a rotor on the shaft, concentric therewith, said housing having a bore eccentric to said rotor and shaft and an annulus within the housing for controlling the rotation of said shaft, said annulus being eccentric to said shaft and rotor.

2. Hydraulic apparatus for transmitting power from a driving member to a member to be driven, said apparatus comprising in combination a cylindrical housing, a shaft extending thereinto, a rotor on the shaft concentric therewith, said housing having a bore eccentric to said rotor and shaft, an annular groove or channel within said housing eccentric to one side of the said rotor eccentric to said shaft and rotor, and an annulus or ring in said groove or channel movable toward and away from the rotor for controlling rotation of the rotor.

3. Hydraulic apparatus for transmitting power from a driving member to a member to be driven, said apparatus comprising in combination a cylindrical housing, a shaft extending thereinto, a rotor concentric with the shaft disposed in a chamber within said housing eccentric to the longitudinal axis of the housing, an annular groove in one wall of said chamber eccentric to the rotor, and an annulus in said groove movable toward and away from the rotor for confining liquid in the rotor chamber or permitting a controlled circulation of the same thereby to govern or control rotation of the rotor.

4. Hydraulic apparatus for transmitting power from a driving member to a member to be driven, said apparatus comprising in combination a cylindrical housing, a shaft to be driven extending thereinto, a driven rotor within a chamber provided by said housing, said rotor and shaft being eccentric to said chamber and concentric with each other, an annular groove in one end wall of said chamber eccentric to the said rotor and shaft, an annulus in said groove, liquid filling the chamber and groove, and means for shifting said annulus along said groove, said annulus when in position nearest the rotor preventing circulation of said liquid to lock the rotor to said shaft, movement of the annulus away from the rotor permitting circulation of the liquid to a degree dependent upon the position of the annulus, to permit the rotor to rotate at a higher speed than said shaft.

5. Hydraulic apparatus for transmitting power from a driving member to a member to be driven, said apparatus comprising in combination a rotatable housing, a shaft to be driven extending thereinto, a driven rotor within a chamber provided by said housing, said rotor and shaft being concentric with each other and eccentric to the said chamber, an annular groove in one end wall of said chamber eccentric to the said rotor and shaft, an annulus in said groove provided with a port extending through the same from one side to the other, liquid filling the chamber and groove, and means at the exterior of the housing for shifting said annulus along said groove toward and away from the motor, whereby with the annulus in its innermost position the said rotor, housing and shaft will be driven at the same speed, rearward movement of the annulus permitting the said liquid to circulate thereby reducing the speed of the driven shaft without reduction in the speed of rotation of the housing.

6. Hydraulic apparatus for transmitting power from a driving member to a driven shaft, said apparatus comprising in combination a rotatable cylindrical housing to which the driving member is rigidly secured, a shaft to be driven extending into said housing, a rotor within said housing upon said shaft, said rotor and shaft being concentric with each other, said housing having a bore eccentric to said rotor and shaft, one end wall of the housing bore being provided with an annular groove eccentric with respect to said shaft and rotor, a ring valve in said groove, means external to said housing for moving said valve along said groove toward and away from said rotor, liquid filling the housing, pawls on the periphery of said rotor pressing against the walls of the rotor chamber with varying pressure to provide against the passage of liquid between the rotor and rotor chamber peripherally of the rotor, said pawls being operable irrespective of the direction of rotation of the rotor, said ring valve when in its innermost position confining the liquid in said rotor chamber whereby rotation of said housing will effect rotation of said rotor and driven shaft as a unit, outward movement of said valve permitting of circulation of the liquid in the rotor chamber whereby the rotor and driven shaft will be rotated at a lower speed than the housing, said apparatus being operable irrespective of the direction of rotation of the driving member.

7. Hydraulic apparatus comprising in combination a rotatable cylindrical housing, a partition across the housing dividing the interior of the housing into two chambers, a driving member secured to one end of said housing for rotating the same, a shaft to be driven extending through the opposite end of the housing, a plate keyed thereto, a planetary gear train in one of said chambers by which the plate and housing are geared together, a rotor loose on said shaft and located in the other of said chambers, said rotor and shaft being concentric with each other but eccentric with respect to the last mentioned chamber, pairs of sealing pawls on the periphery of said rotor pressing against the walls of the rotor chamber, an annular groove in the end of the rotor chamber remote from the said gear train, said groove being eccentric to said rotor and driven shaft, a ported ring in said groove, liquid filling said housing, and means external to the said housing for shifting said ported ring lengthwise of the housing, to vary the effective area of the rotor chamber, thereby to vary the rotation of said rotor and driven shaft relatively to said housing.

8. Hydraulic apparatus comprising in combination a rotatable housing, a shaft to be driven rigidly connected to one end of said housing, a driving shaft extending into the opposite end of said housing, a rotor within the housing rigidly mounted upon said driving shaft, an annular groove in the inner face of the end of the housing which is secured to the shaft to be driven, the said rotor and driving shaft being concentric with each other and eccentric to the chamber provided by the housing, said groove being eccentric to the rotor and driving shaft, a ring fitting said groove, a spider at the exterior of said housing secured to said ring and adjustable to move said ring toward and away from said rotor, liquid filling the housing, and sealing pawls on the periphery of said rotor constantly in sealing engagement with the housing wall, whereby with said ring in its innermost position the rotor is hydraulically locked against rotation relatively to the housing and the driven shaft will be driven as a unit with the driving shaft, outward movement of the said ring permitting of liquid circulation to reduce the speed of the housing and driven shaft relatively to the driving shaft.

9. Hydraulic apparatus comprising in combination a stationary housing, a rotatable housing within the stationary housing, liquid filling both housings, a shaft secured directly to one end of the rotatable housing, another shaft extending through the opposite end of the rotatable housing, a partition across the interior of the rotatable housing to provide a rotor chamber at one side of the partition between it and the end of the housing which receives the second mentioned shaft, a gear system in the chamber at the opposite side of said partition, between the second shaft and the rotatable housing a rotor in the said rotor chamber, a closure member for one end of the rotor chamber, means for shifting said closure member longitudinally of the second shaft to vary the capacity of the rotor chamber, inward shifting of the said closure member into position to reduce the rotor chamber to its minimum capacity hydraulically locking the rotor against rotation relatively to the second shaft, thereby to effect driving of the two shafts as a unit, shifting of the said closure member in the opposite direction effecting a slowing down of the second shaft relatively to the first shaft which slow-down reaches its maximum when the said closure member has reached the end of its possible outward movement.

ROBERT K. PEPPER.

REFERENCES CITED

The following references are of record in the file of this patent:

UNITED STATES PATENTS

| Number | Name | Date |
|---|---|---|
| 1,830,156 | Zahn | Nov. 3, 1931 |

FOREIGN PATENTS

| Number | Country | Date |
|---|---|---|
| 705,223 | France | Mar. 3, 1931 |